(12) United States Patent
Gong et al.

(10) Patent No.: US 8,995,326 B2
(45) Date of Patent: Mar. 31, 2015

(54) TECHNIQUES FOR BROADCAST/MULTICAST DELIVERY IN WIRELESS NETWORKS

(75) Inventors: Michelle X. Gong, Sunnyvale, CA (US); Adrian P. Stephens, Cambridge (GB); Robert J. Stacey, Portland, OR (US)

(73) Assignee: Intel Corporation, Santa Clara, CA (US)

(*) Notice: Subject to any disclaimer, the term of this patent is extended or adjusted under 35 U.S.C. 154(b) by 969 days.

(21) Appl. No.: 12/456,916

(22) Filed: Jun. 23, 2009

(65) Prior Publication Data

US 2010/0322130 A1  Dec. 23, 2010

(51) Int. Cl.
| | |
|---|---|
| *H04H 20/71* | (2008.01) |
| *H04W 4/00* | (2009.01) |
| *H04W 28/12* | (2009.01) |
| *H04L 12/18* | (2006.01) |
| *H04W 4/06* | (2009.01) |
| *H04W 40/02* | (2009.01) |
| *H04W 84/12* | (2009.01) |

(52) U.S. Cl.
CPC ............ *H04W 28/12* (2013.01); *H04L 12/1886* (2013.01); *H04W 4/06* (2013.01); *H04W 40/023* (2013.01); *H04W 84/12* (2013.01)
USPC .......................................... 370/312; 370/338

(58) Field of Classification Search
USPC ................... 370/338–347, 389–392
See application file for complete search history.

(56) References Cited

U.S. PATENT DOCUMENTS

| | | | |
|---|---|---|---|
| 2004/0204108 A1 | 10/2004 | Etkin et al. | |
| 2005/0059406 A1 | 3/2005 | Thomson et al. | |
| 2005/0075140 A1* | 4/2005 | Famolari | 455/562.1 |
| 2007/0165592 A1* | 7/2007 | Gossain et al. | 370/349 |
| 2007/0254619 A1 | 11/2007 | Salomone et al. | |
| 2008/0002692 A1 | 1/2008 | Meylan et al. | |
| 2008/0137681 A1 | 6/2008 | Kish et al. | |
| 2008/0186914 A1* | 8/2008 | Na | 370/329 |
| 2008/0205385 A1* | 8/2008 | Zeng et al. | 370/389 |
| 2009/0010191 A1* | 1/2009 | Wentink | 370/311 |
| 2009/0213776 A1* | 8/2009 | Chu et al. | 370/312 |
| 2009/0296673 A1* | 12/2009 | Beach | 370/338 |
| 2010/0103045 A1* | 4/2010 | Liu et al. | 342/372 |

FOREIGN PATENT DOCUMENTS

| | | |
|---|---|---|
| JP | 2007-052176 A | 3/2007 |
| JP | 2007-521761 A | 8/2007 |
| JP | 2007-329612 A | 12/2007 |
| JP | 2008-005943 A | 1/2008 |

(Continued)

OTHER PUBLICATIONS

International Preliminary Report on Patentability Received for PCT Patent Application No. PCT/US2010/036892, mailed on Jan. 12, 2012, 5 pages.

(Continued)

*Primary Examiner* — Brandon Renner
(74) *Attorney, Agent, or Firm* — Ellis B. Ramirez; Prass LLP

(57) ABSTRACT

An embodiment of the present invention provides an apparatus including a transceiver operable for broadcast/multicast traffic delivery in a wireless network, wherein the transceiver is adapted to identify local broadcast traffic and limit a broadcast domain to a basic service set (BSS) servicing the local broadcast traffic.

17 Claims, 4 Drawing Sheets

| TO DS | FROM DS | ADDRESS 1 | ADDRESS 2 | ADDRESS 3 | ADDRESS 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

400

(56) References Cited

FOREIGN PATENT DOCUMENTS

| | | |
|---|---|---|
| JP | 2009-543476 A | 12/2009 |
| WO | 2008/005943 A2 | 1/2008 |
| WO | 2008/005947 A2 | 1/2008 |
| WO | 2011/005383 A2 | 1/2011 |

OTHER PUBLICATIONS

International Search Report and Written Opinion received for PCT Patent Application No. PCT/US2010/036892, mailed on Jan. 24, 2011, 9 pages.

Cordeiro et al., "Implications of usage models on TGad network architecture", IEEE 802.11-09/0391r0, Mar. 11, 2009, 10 Pages.

Office Action received for Japanese Patent Application No. 2012-514992, mailed on Jan. 22, 2013, 5 pages of Office Action and 1 pages of English Translation.

Office Action received for Korean Patent Application No. 2011-7030735, mailed on May 28, 2013, 2 pages of English Translation only.

IEEE Standard, "Part 11: Wireless LAN Medium Access Control (MAC) and Physical Layer (PHY) Specifications High-speed Physical Layer in the 5 GHZ Band", Includes IEEE Std 802.11, XP017603987 ISBN: 978-0-7381-4772-7, 1999 Edition, 90 pages.

Notice of Allowance received for Korean Patent Application No. 10-2011-7030735, mailed on Dec. 21, 2013, 2 pages of Notice of Allowance and 1 page of English Translation.

European Search Report received for European Patent Application No. 10797497.4 mailed on Nov. 22, 2013, 12 pages.

Simon Black et al., "Wireless Access Method and Physical Layer Specification", IEEE Draft, 1195065, vol. Doc: IEEE P802.11-95/65, XP017606603, Mar. 19, 2001, pp. 1-39.

Office Action received for Chinese Patent Application No. 201010220459.4, mailed on Oct. 29, 2013, 3 Pages of Office Action and 5 pages of English Translation.

Office Action received for Japan Patent Application No. 201010220459.4, mailed on Feb. 1, 2013, 14 pages of office action includes 8 pages of english translation.

Office Action Received for European Patent Application No. 10797497.4, mailed on Jul. 17, 2014, 3 pages.

Office Action received for Chinese Patent Application No. 201010220459.4, mailed on Jul. 24, 2014, 5 pages of English translation and 8 pages of Office Action.

Nagata, et al., "Wireless Local Area Network Standardization of IEEE 802.11 and the Wi-Fi Alliance", Global Standardization Activities, vol. 8, No. 4, Apr. 2010, 7 pages.

\* cited by examiner

| B1 | B2 B3 | B4 B7 | B8 | B9 | B10 | B11 | B12 | B13 | B14 |
|---|---|---|---|---|---|---|---|---|---|
| COL ON | TYPE | SUBTYPE | TO DS | FROM DS | MORE FRAG | RETRY | PWR MGT | MORE DATA | PROTECTED FRAME |

| TO DS | FROM DS | ADDRESS 1 | ADDRESS 2 | ADDRESS 3 | ADDRESS 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

*FIG. 4*

| TO DS | FROM DS | ADDRESS 1 | ADDRESS 2 | ADDRESS 3 | ADDRESS 4 |
|---|---|---|---|---|---|
| 1 | 1 | RA | TA | DA | SA |

*FIG. 5*

TECHNIQUES FOR BROADCAST/MULTICAST DELIVERY IN WIRELESS NETWORKS

BACKGROUND

Broadcast traffic is prevalent over wireless networks. Sources of broadcast traffic include ARP, DHCP, layer-3 service discovery protocols, etc. Therefore, broadcast traffic suppression and efficient broadcast traffic delivery are critical for conserving network bandwidth. In addition, broadcast delivery in 60 GHz networks can be very inefficient due to the nature of directional transmission.

Thus, a strong need exists for improved techniques for broadcast/multicast delivery in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 depicts the original address field contents in 802.11 data packets;

FIG. 5 shows a proposed four-address frame format according to embodiments of the present invention.

Figure 1:
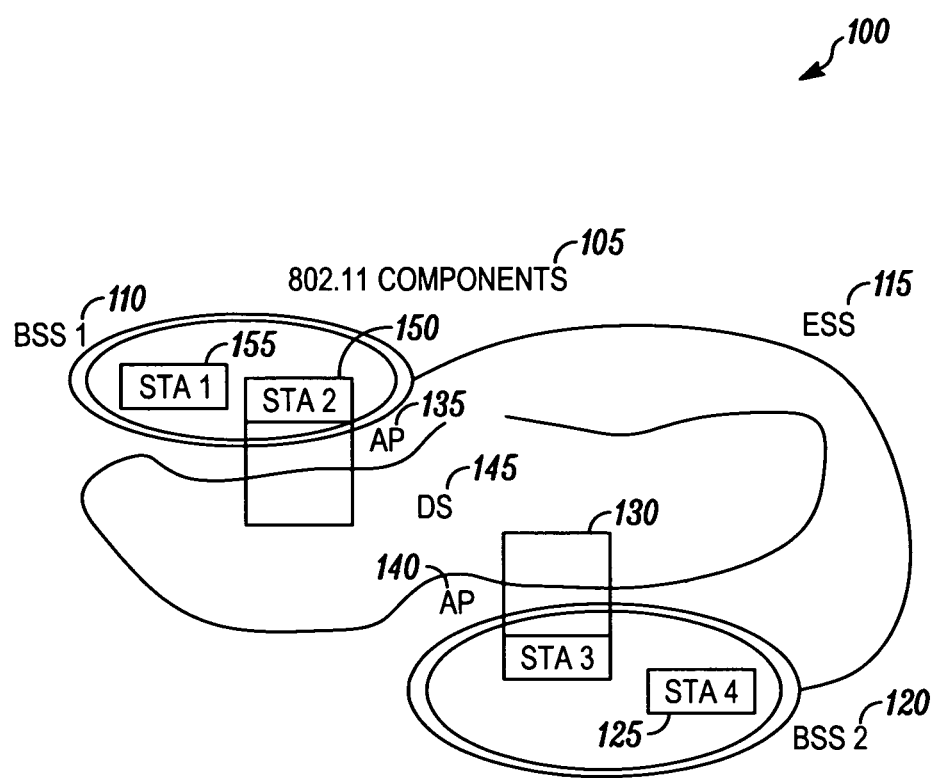
FIG. 1 depicts an exemplary wireless local area network (WLAN) according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide new broadcast/multicast traffic delivery mechanisms for wireless networks, such as, but not limited to, 60 GHz wireless local area networks (WLANs) and wireless personal area networks (WPANs). Further, embodiments of the present invention provide a broadcast/multicast traffic suppression mechanism for WLANs.

Looking now at FIG. 1 is illustrated the interconnection of WLAN 100, access points (APs) 135, 140 or basic service sets (BSSs) 110, 120 via a Distribution System (DS) 145. The union of interconnected BSSs is referred to as an Extended Service Set (ESS) 115. Because wireless stations (STAs) 125, 130, 150 and 155 within the same ESS 115 are on the same subnet, broadcast traffic from one STA can reach all other STAs in the same ESS 115.

In many usage scenarios, it is unnecessary to transmit broadcast traffic to the whole ESS. For instance, a wireless display or a wireless projector may broadcast periodically to the network to announce its services. Because any user who uses the display must be within a short distance from the display to be able to see what's on the screen, the STA used by the user should be in the same BSS as the display.

Figures 2, 3:
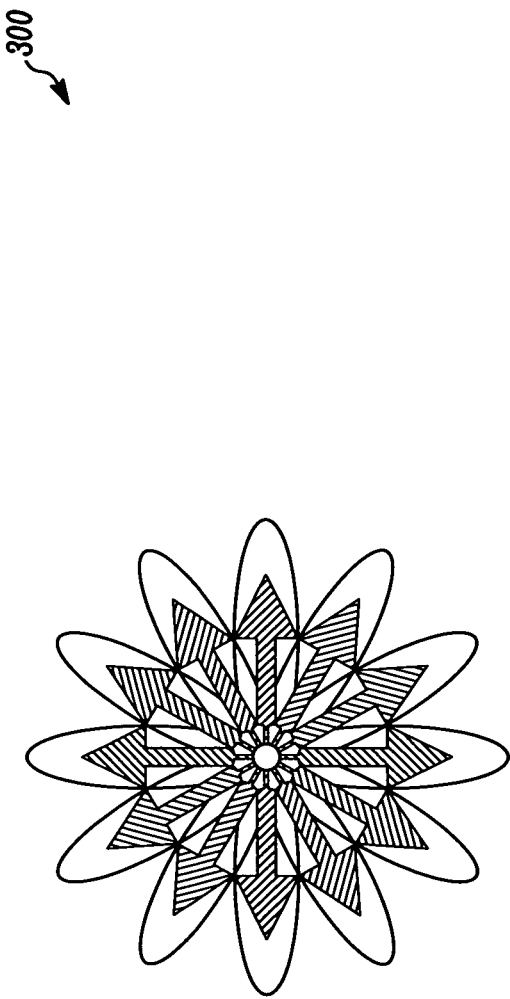
FIG. 2 depicts a frame format of the original frame control field according to embodiments of the present invention.
FIG. 3 illustrates a transmit (Tx) sector sweep according to embodiments of the present invention.

Therefore, devices such as a wireless display only need to broadcast its services or capabilities to the BSS that it's in. Currently, the Institute for Electronics and Electrical Engineers (IEEE) 802.11 standard does not provide a mechanism to differentiate local broadcast traffic from network-wide broadcast traffic. A STA with broadcast traffic would just forward it to the AP and the AP re-broadcast it to the whole ESS, not only wasting network bandwidth but also wasting battery power of STAs in the ESS. Embodiments of the present invention identify local broadcast traffic and limit the broadcast domain to the same BSS. In one embodiment, a "BSS-only" bit is defined in the frame control field. For instance, some of the bits in the original frame control field can be overloaded. The meaning of the overloaded bit can be inferred from a new PHY such as the 60 GHz PHY. Upon receiving a packet with the BSS-only bit set, the AP may re-broadcast the packet only within its own BSS rather than forwarding it to the whole ESS. FIG. 2 at 200 illustrates the frame format of the original frame control field.

In another embodiment of the present invention, a well-known multicast address may be defined to indicate BSS-only broadcast. If the destination address (DA), i.e. Address 3, is set to the well-know multicast address, upon receiving such a packet from a STA, the AP rebroadcasts the packet only within its own BSS.

In a 60 GHz network, broadcast operation can be very inefficient due to the directionality of antennas. For instance, if a phased array has 32 sectors, the broadcast packet needs to be transmitted 32 times using a transmit (Tx) sweep as illustrated generally as 300 of FIG. 3. In addition, the feasible data rate for Tx sector sweep is very low because there will be no receive beam-forming gain. As defined in the IEEE 802.15.3 standard, a non-PCP STA has to wait for other non-PCP STAs to wake up to deliver the broadcast traffic to them. If non-PCP STAs have different wakeup intervals, the source of the broadcast traffic may have to wake up multiple times to deliver one broadcast packet and needs to be beam-trained with every other STA in the network.

To improve bandwidth efficiency and energy efficiency, embodiments of the present invention provide a unified approach for broadcast traffic delivery that's suitable for both 60 GHz WLANs and 60 GHz WPANs, although the present invention is not limited in this respect. The procedure is as follows: First, a non-PCP STA transmits the broadcast packet to the PCP by setting the To DS field to 1 and setting Address 3 to the broadcast address. FIG. 4, generally at 400, illustrates original address field contents in 802.11 data packets.

Secondly, the PCP delivers the broadcast packet using one of the following methods.

1. Broadcast to Unicast Conversion:

The PCP converts the broadcast packet into multiple unicast packets and places them into each STA's individual queue. To preserve the original broadcast DA address, one of the following two methods may be used. In one embodiment, a four-address frame format is used as illustrated in FIG. 5 at 500. Because the RA is a unicast address, the converted unicast frame will not be mistaken as a WDS packet.

In another embodiment, the aggregate MAC Service Data Unit (A-MSDU) frame format may be utilized to carry the original broadcast DA. Note that the original broadcast or multicast DA address needs to be preserved in the converted unicast frame to indicate to the receiver that the packet is originally a broadcast/multicast packet because broadcast/multicast traffic is treated differently at the upper layers.

2. Directional Multicast:

In addition to the broadcast converting to unicast approach, a directional multicast approach may be utilized in some embodiments of the present invention. Source STAs of the broadcast traffic send it to the PCP. The PCP may schedule either a group-addressed service period (SP) or multiple individual SPs and deliver aggregated broadcast traffic to all STAs. The STAs need to implement duplicate detection to avoid receiving the same broadcast/multicast frame multiple times. Duplicate frame filtering is facilitated through the inclusion of a sequence number and TID subfield within broadcast/multicast frames. The sequence numbers for broadcast/multicast frames are generated by different counters for each TID and transmitter address. The receiving STA keeps a cache of recently received <Address 2, TID, sequence-number> tuples for all STAs from whom it has received broadcast/multicast frames. Two methods can be used to mitigate potential problems when different STAs have different wakeup schedules: 1) the same broadcast frame is transmitted in the same SP and 2) a STA only accepts broadcast packets sent in its own SPs.

3. Broadcast Using Sector or Beam Sweep:

Another way to distribute a broadcast frame is using a PHY supported beam sweep or sector sweep. This embodiment of the present invention may transmit the broadcast frame one or more times in a manner such that at least one copy of the frame is received by each STA on the network. The frame is transmitted in a manner that allows STAs to detect and discard duplicates.

Figure 6:
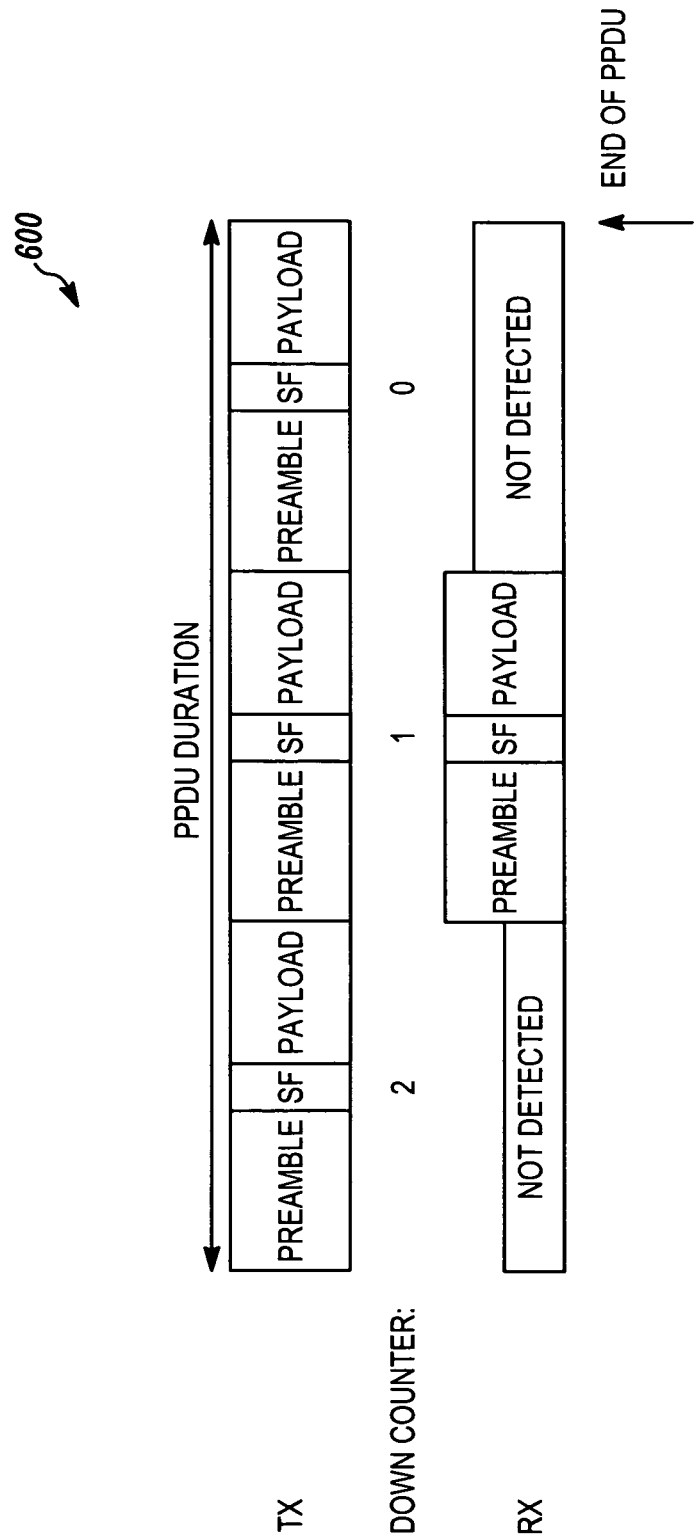
FIG. 6 depicts a beamsweep PLCP Protocol Data Unit (PPDU) according to embodiments of the present invention.

The mechanism proposed is illustrated generally as 600 of FIG. 6 which shows a beam sweeping PPDU. The sender transmits the same MPDU multiple times using a different antenna pattern each time. The antenna patterns may be derived from phase weights in the case of a phased array or may be one or more directional antennas or some combination of the two. The antenna patterns used may be a combination of the optimal beam pattern for a phased array arrived at through a training process with individual STAs such that the aggregate of the beam patterns reaches all STAs and a random or calibrated set of phase weights for a phased array such that the aggregate of the transmissions covers the region of space in which all STAs lie.

A STA that receives more than one copy of the MPDU is able to detect duplicates by: a) noting the remaining PPDU duration on the first segment received; and b) identifying subsequent segments received as belonging to the same sequence and forming part of the same PPDU.

An additional advantage of this technique is that if the STA detects one segment but fails to successfully demodulate it, it may combine the payload samples with the subsequent segments (chase combining) to increase the likelihood that one of the subsequent segments will be successfully demodulated. The combining is iterative—first segment combined with second, first and second combined with third, until the payload is successfully demodulated.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of improving bandwidth efficiency and energy efficiency for broadcast delivery in wireless networks, comprising:

using a unified approach for broadcast traffic delivery that includes limiting a broadcast packet by a station (STA) to within a basics service set (BSS) forming part of an extended service set (ESS) by setting a To distribution system (DS) field to 1 and setting an Address 3 field to a broadcast address; and wherein an access point (AP) within the basics service set (BSS) delivers said broadcast packet using a broadcast to unicast conversion or a directional multicast or a broadcast using sector or beam sweep;

wherein in said directional multicast, source STAs of said broadcast traffic send said broadcast traffic to said AP and said AP schedules either a group-addressed service period (SP) or multiple individual SPs and delivers aggregated broadcast traffic to all STAs;

wherein said STAs implement duplicate detection to avoid receiving a same broadcast/multicast frame multiple times and wherein duplicate frame filtering is facilitated through the inclusion of a sequence number and traffic identifier (TID) subfield within broadcast/multicast frames;

wherein said sequence numbers for broadcast/multicast frames are generated by different counters for each TID and transmitter address, and a receiving STA keeps a cache of recently received Address 2, TID, sequence-number tuples for all STAs from which said STAs have received broadcast/multicast frames.

2. The method of claim 1, wherein in said broadcast to unicast conversion, said AP converts said broadcast packet into multiple unicast packets and places them into each STA's individual queue; and wherein said wireless network is a 60 GHz wireless local area network (WLAN) or a wireless personal area network (WPAN).

3. The method of claim 2, wherein to preserve an original broadcast destination address (DA) address, a four-address frame format is used or an aggregate MAC Service Data Unit (A-MSDU) frame format is utilized to carry an original broadcast DA.

4. The method of claim 1, further comprising mitigating potential problems when different STAs have different wakeup schedules by transmitting a same broadcast frame in a same SP or accepting only accepts broadcast packets sent in its own SPs by said STA.

5. The method of claim 1, wherein said broadcast using sector or beam sweep comprises transmitting said broadcast frame one or more times in a manner such that at least one copy of the frame is received by each STA on said network and in a manner that allows said STAs to detect and discard duplicates.

6. The method of claim 5, wherein a sender transmits a same MAC protocol data unit (MPDU) multiple times using a different antenna pattern each time and wherein said antenna patterns may be derived from phase weights in the case of a phased array or may be one or more directional antennas or some combination of the two.

7. The method of claim 6, wherein said antenna patterns used may be a combination of an optimal beam pattern for a phased array arrived at through a training process with individual STAs such that the aggregate of the beam patterns reaches all STAs or a random or calibrated set of phase weights for a phased array such that the aggregate of the transmissions covers the region of space in which all STAs lie.

8. The method of claim 7, wherein a STA that receives more than one copy of an MPDU is able to detect duplicates by noting the remaining PPDU duration on the first segment received and identifying subsequent segments received as belonging to a same sequence and forming part of the same PHY protocol data unit (PPDU).

9. An apparatus, comprising:
a transceiver operable for broadcast/multicast traffic delivery in a wireless network, wherein said transceiver is adapted to improve bandwidth efficiency and energy efficiency for broadcast delivery in wireless networks by using a unified approach for broadcast traffic delivery that includes transmitting by limiting a broadcast packet from a station (STA) to within a basics service set (BSS) forming part of an extended service set (ESS) by setting a To DS field to 1 and setting an Address 3 field to a broadcast address; and
wherein an access point (AP) within the basics service set (BSS) uses the information in the Address 3 field to deliver said broadcast packet using a broadcast to unicast conversion or a directional multicast or a broadcast using sector or beam sweep;
wherein in said directional multicast, source STAs of said broadcast traffic send said broadcast traffic to said AP and said AP schedules either a group-addressed service period (SP) or multiple individual SPs and delivers aggregated broadcast traffic to all STAs;
wherein said STAs implement duplicate detection to avoid receiving a same broadcast/multicast frame multiple times and wherein duplicate frame filtering is facilitated through the inclusion of a sequence number and traffic identifier (TID) subfield within broadcast/multicast frames;
wherein said sequence numbers for broadcast/multicast frames are generated by different counters for each TID and transmitter address, and a receiving STA keeps a cache of recently received Address 2, TID, sequence-number tuples for all STAs from which said STAs have received broadcast/multicast frames;
wherein to preserve an original broadcast destination address (DA) address, a four-address frame format is used or an aggregate MAC Service Data Unit (A-MSDU) frame format is utilized to carry an original broadcast DA;

wherein a STA that receives more than one copy of a MAC protocol data unit (MPDU) is able to detect duplicates by noting the remaining PHY protocol data unit (PPDU) duration on the first segment received and identifying subsequent segments received as belonging to a same sequence and forming part of the same PPDU.

10. The apparatus of claim 9, wherein in said broadcast to unicast conversion, said AP converts said broadcast packet into multiple unicast packets and places them into each STA's individual queue.

11. The apparatus of claim 9, wherein in said directional multicast, source STAs of said broadcast traffic send said broadcast traffic to said AP and said AP schedules either a group-addressed service period (SP) or multiple individual SPs and delivers aggregated broadcast traffic to all STAs.

12. The apparatus of claim 9, wherein said broadcast using sector or beam sweep comprises transmitting said broadcast frame one or more times in a manner such that at least one copy of said frame is received by each STA on said network and in a manner that allows said STAs to detect and discard duplicates.

13. A method, comprising:
limiting transmissions for broadcast/multicast traffic in a wireless network to local broadcast traffic by setting in a packet from a station (STA) a destination address (DA) field to a multicast address and by using a transceiver adapted to identify from an Address 3 field said local broadcast traffic and then limiting a broadcast domain to a basic service set (BSS) servicing said local broadcast traffic, wherein the multicast address is defined to indicate BSS-only broadcast;
wherein to avoid receiving a same broadcast/multicast frame multiple times a duplicate frame filtering is facilitated through the inclusion of a sequence number and traffic identifier (TID) subfield within broadcast/multicast frames;
wherein a sequence numbers for broadcast/multicast frames are generated by different counters for each TID and transmitter address, and a receiving STA keeps a cache of recently received Address 2, TID, sequence-number tuples for all STAs from which said STAs have received broadcast/multicast frames;
wherein to preserve an original broadcast destination address (DA) address, a four-address frame format is used or an aggregate MAC Service Data Unit (A-MSDU) frame format is utilized to carry an original broadcast DA;
wherein a STA that receives more than one copy of a MAC protocol data unit (MPDU) is able to detect duplicates by noting the remaining PHY protocol data unit (PPDU) duration on the first segment received and identifying subsequent segments received as belonging to a same sequence and forming part of the same PPDU.

14. The method of claim 13, wherein said wireless network is a 60 GHz wireless local area network (WLAN) or a wireless personal area network (WPAN).

15. The method of claim 13, further comprising said transceiver using a BSS-only bit defined in a frame control field and wherein upon receiving a packet with said BSS-only bit set, said transceiver re-broadcasts said packet only within its own BSS rather than forwarding it to a whole extended service set.

16. The method of claim 13, wherein a known multicast address is defined to indicate a BSS-only broadcast.

17. A method of improving bandwidth efficiency and energy efficiency for broadcast delivery in a 60 GHz wireless local area network (WLAN), comprising:

using a unified approach for broadcast traffic delivery that includes limiting a broadcast packet by a station (STA) to within a basics service set (BSS) forming part of an extended service set (ESS) by setting a To distribution system (DS) field to 1 and setting an Address 3 field to a broadcast address; and wherein an access point (AP) within the basics service set (BSS) delivers said broadcast packet using a broadcast to unicast conversion or a directional multicast or a broadcast using sector or beam sweep;

wherein said broadcast using sector or beam sweep comprises transmitting said broadcast frame one or more times in a manner such that at least one copy of the frame is received by each STA on said network and in a manner that allows said STAs to detect and discard duplicates;

wherein a sender transmits a same MAC protocol data unit (MPDU) multiple times using a different antenna pattern each time and wherein said antenna patterns is derived from phase weights in the case of a phased array or is one or more directional antennas or some combination of the two;

wherein said antenna patterns used is a combination of an optimal beam pattern for a phased array arrived at through a training process with individual STAs such that the aggregate of the beam patterns reaches all STAs or a random or calibrated set of phase weights for a phased array such that the aggregate of the transmissions covers the region of space in which all STAs lie;

wherein a STA that receives more than one copy of an MPDU is able to detect duplicates by noting the remaining PPDU duration on the first segment received and identifying subsequent segments received as belonging to a same sequence and forming part of the same PHY protocol data unit (PPDU).

\* \* \* \* \*